(12) United States Patent
Sampath

(10) Patent No.: US 6,862,440 B2
(45) Date of Patent: Mar. 1, 2005

(54) METHOD AND SYSTEM FOR MULTIPLE CHANNEL WIRELESS TRANSMITTER AND RECEIVER PHASE AND AMPLITUDE CALIBRATION

(75) Inventor: Hemanth Sampath, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 435 days.

(21) Appl. No.: 10/158,734

(22) Filed: May 29, 2002

(65) Prior Publication Data

US 2003/0224750 A1 Dec. 4, 2003

(51) Int. Cl.[7] .......................... H04B 1/06; H04B 17/00
(52) U.S. Cl. ................. 455/276.1; 455/226.1; 455/295; 375/346; 329/304; 329/320
(58) Field of Search .................. 455/63.1, 67.11, 455/67.13, 226.1, 226.2, 226.3, 271, 276.1, 283, 284, 295, 296, 423, 424; 375/148, 150, 254, 346, 349; 329/304, 315, 318, 320

(56) References Cited

U.S. PATENT DOCUMENTS

| | | | | |
|---|---|---|---|---|
| 5,099,493 A | * | 3/1992 | Zeger et al. | ................. 375/148 |
| 5,359,627 A | * | 10/1994 | Resnikoff | ................... 375/254 |
| 5,615,209 A | * | 3/1997 | Bottomley | ................... 375/150 |
| 5,705,949 A | | 1/1998 | Alelyunas et al. | |

FOREIGN PATENT DOCUMENTS

| | | |
|---|---|---|
| EP | 1 098 390 A2 | 5/2001 |
| EP | 1 133 093 A1 | 9/2001 |
| EP | 1 178 640 A1 | 2/2002 |

* cited by examiner

*Primary Examiner*—Quochien B. Vuong
(74) *Attorney, Agent, or Firm*—Michael A. Proksch

(57) ABSTRACT

The present invention provides a method and system for estimating common amplitude and phase errors of a multiple channel wireless system. The multiple channel wireless system includes a plurality of transmission channels formed between a plurality of transmission antennas and a plurality of receiver antennas. The method includes estimating transmission channel elements between each transmission antenna and receiver antenna pair of the multiple channel wireless system. Calibration symbols are transmitted from each transmit antenna. Signals are received that correspond to the calibration symbols having traveled through the transmission channels. Received calibration symbols are estimated based upon spatial processing of the received signals and the estimated transmission channel elements. Common amplitude and phase errors are estimated for each transmit and receive antenna pair by comparing the transmitted calibration symbols with the received calibration symbols.

20 Claims, 12 Drawing Sheets

```
┌─────────────────────────────────────────────┐
│ ESTIMATING TRANSMISSION CHANNEL ELEMENTS BETWEEN EACH │
│ TRANSMISSION ANTENNA AND RECEIVER ANTENNA PAIR OF THE │
│ MULTIPLE CHANNEL WIRELESS SYSTEM FOR A PLURALITY OF   │──1210
│ CARRIERS OF A MULTIPLE CARRIER TRANSMISSION SIGNAL AND A │
│ PLURALITY OF TIME SLOTS                               │
└─────────────────────────────────────────────┘
                     │
                     ▼
┌─────────────────────────────────────────────┐
│ TRANSMITTING CALIBRATION SYMBOLS FROM EACH   │
│ TRANSMIT ANTENNA FOR THE PLURALITY OF CARRIERS │──1220
│ OF THE MULTIPLE CARRIER TRANSMISSION SIGNAL   │
│ AND PLURALITY OF TIME SLOTS                   │
└─────────────────────────────────────────────┘
                     │
                     ▼
┌─────────────────────────────────────────────┐
│ RECEIVING SIGNALS CORRESPONDING TO THE       │
│ CALIBRATION SYMBOLS HAVING TRAVELED           │──1230
│ THROUGH THE TRANSMISSION CHANNELS             │
└─────────────────────────────────────────────┘
                     │
                     ▼
┌─────────────────────────────────────────────┐
│ ESTIMATING RECEIVED CALIBRATION SYMBOLS      │
│ BASED UPON SPATIAL PROCESSING OF THE         │──1240
│ RECEIVED SIGNALS AND THE ESTIMATED           │
│ TRANSMISSION CHANNEL ELEMENTS                │
└─────────────────────────────────────────────┘
                     │
                     ▼
┌─────────────────────────────────────────────┐
│ ESTIMATING COMMON AMPLITUDE AND PHASE        │
│ ERRORS FOR EACH TRANSMIT AND RECEIVE ANTENNA │──1250
│ PAIR BY COMPARING THE TRANSMITTED CALIBRATION │
│ SYMBOLS WITH THE RECEIVED CALIBRATION SYMBOLS │
└─────────────────────────────────────────────┘
```

FIGURE 12

METHOD AND SYSTEM FOR MULTIPLE CHANNEL WIRELESS TRANSMITTER AND RECEIVER PHASE AND AMPLITUDE CALIBRATION

FIELD OF THE INVENTION

The invention relates generally to a wireless communications receiver having multiple receiver channels wireless communications. More particularly, the invention relates to a method and system for calibrating phase and amplitude errors associated with the multiple channel transmitters and receivers.

BACKGROUND OF THE INVENTION

Wireless communication systems commonly include information-carrying modulated carrier signals that are wirelessly transmitted from a transmission source (for example, a base transceiver station) to one or more receivers (for example, subscriber units) within an area or region.

A form of wireless communication includes multiple transmit antennae and/or multiple receiver antennae. Multiple antennae communication systems can support communication diversity and spatial multiplexing.

A Wireless Channel

FIG. 1 shows modulated carrier signals traveling from a transmitter 110 to a receiver 120 following many different (multiple) transmission paths.

Multipath can include a composition of a primary signal plus duplicate or echoed images caused by reflections of signals off objects between the transmitter and receiver. The receiver may receive the primary signal sent by the transmitter, but also receives secondary signals that are reflected off objects located in the signal path. The reflected signals arrive at the receiver later than the primary signal. Due to this misalignment, the multipath signals can cause intersymbol interference or distortion of the received signal.

The actual received signal can include a combination of a primary and several reflected signals. Because the distance traveled by the original signal is shorter than the reflected signals, the signals are received at different times. The time difference between the first received and the last received signal is called the delay spread and can be as great as several micro-seconds.

The multiple paths traveled by the modulated carrier signal typically results in fading of the modulated carrier signal. Fading causes the modulated carrier signal to attenuate in amplitude when multiple paths subtractively combine.

Spatial multiplexing and diversity communication are transmission technologies that exploit multiple antennae at both the base transceiver station and at the subscriber units to increase the bit rate in a wireless radio link with no additional power or bandwidth consumption.

FIG. 2 shows three transmitter antenna arrays 210, 220, 230 that transmit data symbols to a receiver antenna array 240. Each transmitter antenna array and each receiver antenna array include spatially separate antennae. A receiver connected to the receiver antenna array 240 separates the received signals.

Common Amplitude and Phase Errors

Multiple channel transmitters and receivers are generally associated with spatial multiplexing or diversity signals. Multiple channel transmitters and multiple channel receivers can include multiple transmitter and receiver chains.

The multiple transmitter and receiver chains typically include amplitude noise and phase noise that vary over time. Generally, the rate in which the amplitude noise and phase noise vary is greater than a rate in which the transmission channel between the transmitter and receiver varies.

Channel training can be used to characterize the amplitude and phase noise. Channel training, however, requires a large amount of electronics overhead, and requires the transmission of a large amount of calibration information. Additionally, training is not very effective in characterizing amplitude and phase noise if the amplitude and phase noise is changing quickly.

Prior art multiple channel transmitters and multiple channel receiver generally each include a common clock that is associated with transmitter channels or the receiver channels. That is, prior art multiple chain transmitters generally include a common clock for enabling transmission from each of the multiple transmitter chains. Prior art multiple chain receivers generally include a common clock for enabling reception from each of the multiple receiver chains. Therefore, phase and amplitude errors associated with multiple chain transmitters and multiple chain receivers are generally ignored.

More advanced multiple channel wireless systems can include the transmitter chains being individually clocked, and the receiver chains being individually clocked. For example, some advanced systems include each transmitter residing at a separate base transmitter station (multiple base multiple channel system).

Multiple base spatial multiplexing or transmitter diversity systems can be much more sensitive to phase and amplitude errors than single base systems. Calibration of the phase and amplitude errors can be much more difficult because each transmitter chain is synchronized to a different clock. Multiple chain receivers having different clocks associated with each receiver chain are also difficult to calibrate.

Some wireless systems (such as mobile wireless systems and local area networks (LANs)) include interfacing transmitters and receivers that are manufactured by different companies. This can result in receivers and transmitters that include varying types of transmission and receiver chains that each influence amplitude and phase noise differently. In addition, these systems can include transmission from mobile transmitters having varied transmission channels.

It is desirable to have a method and system for calibrating phase and amplitude errors associated with transmitting and receiving multiple information signals with transmission and receiver chains that individually contribute phase and amplitude noise. The method and system should be adaptable for use with presently existing multiple channel systems without adding appreciable cost. The method and system should allow for the transmission of higher orders of modulation.

SUMMARY OF THE INVENTION

The invention includes a method and system for calibrating phase and amplitude errors associated with transmitting and receiving multiple information signals between transmission and receiver chains that are individually clocked, spatially separate or include varying types of electronic components. The method and system can be adapted for use with presently existing multiple channel systems without adding appreciable cost. The method and system allows for the transmission of higher orders of modulation.

A first embodiment of the invention includes a method for estimating common amplitude and phase errors of a multiple channel wireless system. The multiple channel wireless system includes a plurality of transmission channels formed between a plurality of transmission antennas and a plurality of receiver antennas. The method includes estimating transmission channel elements between each transmission antenna and receiver antenna pair of the multiple channel wireless system. Calibration symbols are transmitted from each transmit antenna. Signals are received that correspond to the calibration symbols having traveled through the transmission channels. Received calibration symbols are estimated based upon spatial processing of the received signals and the estimated transmission channel elements. Common amplitude and phase errors are estimated for each transmit and receive antenna pair by comparing the transmitted calibration symbols with the received calibration symbols.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 12 shows a flow chart of steps or acts included within another embodiment of the invention.

DETAILED DESCRIPTION

Figure 1:
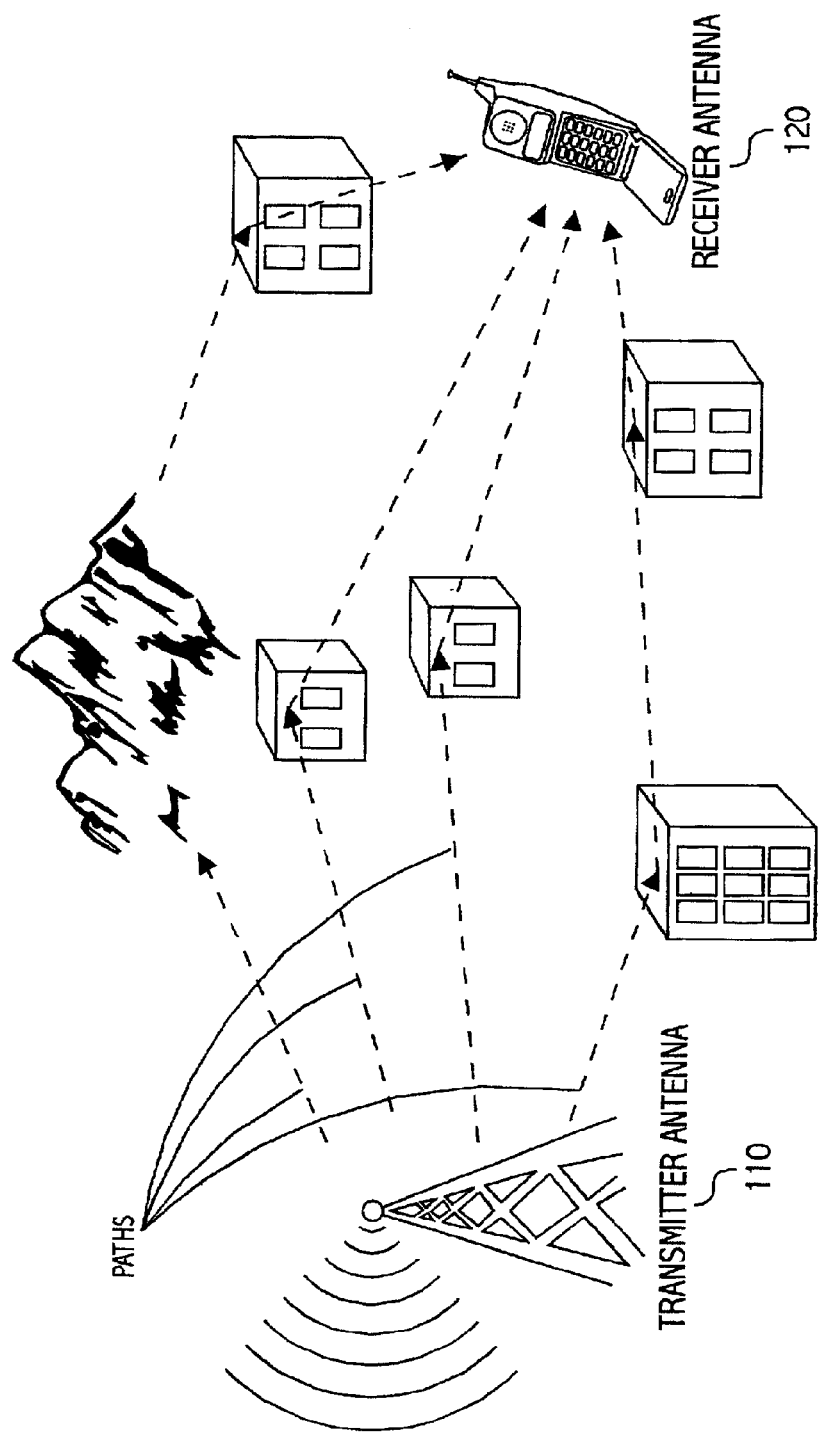
FIG. 1 shows a prior art wireless system that includes multiple paths from a system transmitter to a system receiver.
Figure 2:
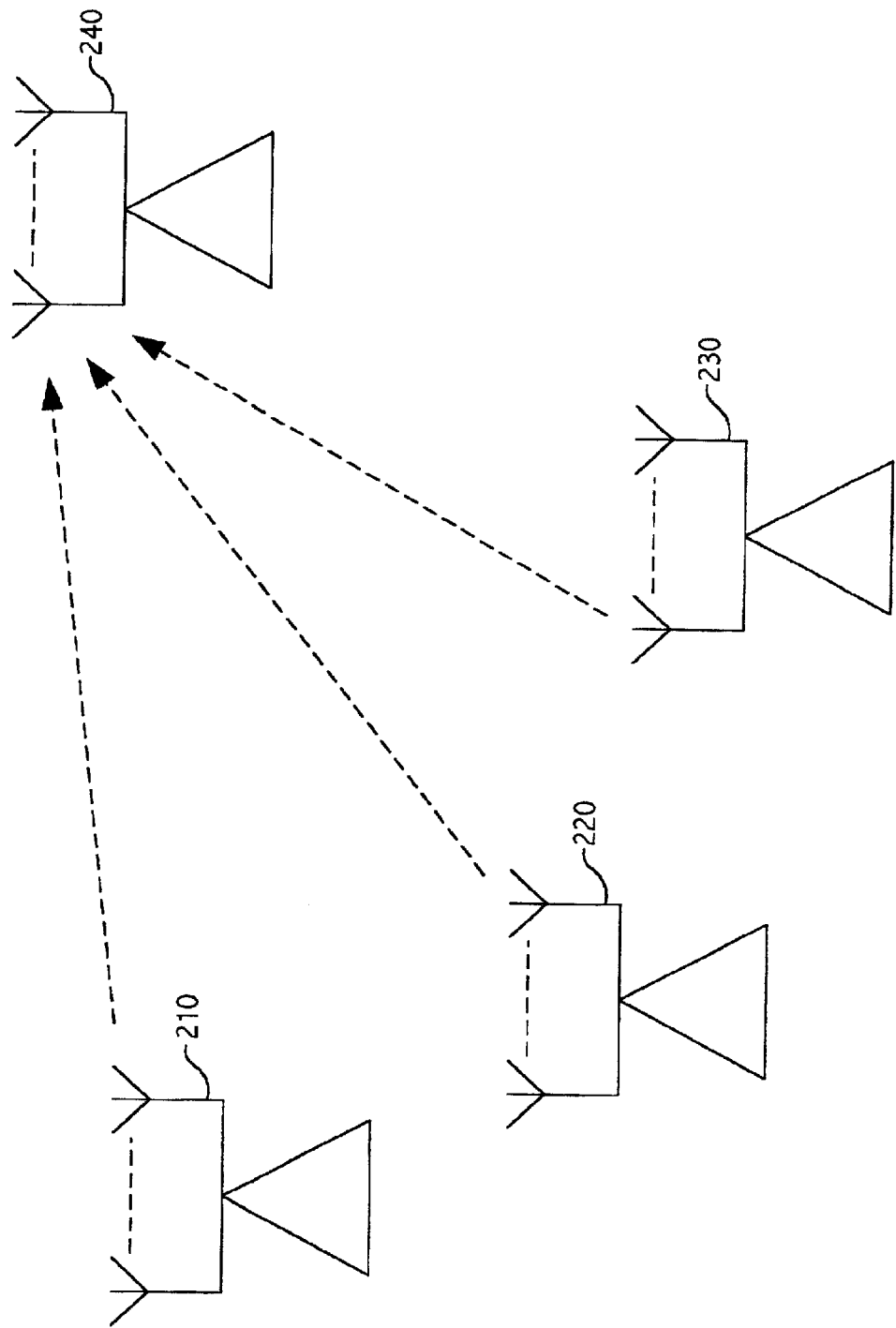
FIG. 2 shows a prior art wireless system that includes spatially separate transmitter antennae and spatially separate receiver antennae.

As shown in the drawings for purposes of illustration, the invention is embodied in a method and system for calibrating phase and amplitude errors associated with transmitting and receiving multiple information signals between transmission and receiver chains that are individually clocked, spatially separate or include varying types of electronic components. The method and system can be adapted for use with presently existing multiple channel systems without adding appreciable cost. The method and system allows for the transmission of higher orders of modulation.

Particular embodiments of the present invention will now be described in detail with reference to the drawing figures. The techniques of the present invention may be implemented in various different types of wireless communication systems. Of particular relevance are cellular wireless communication systems. A base station transmits downlink signals over wireless channels to multiple subscribers. In addition, the subscribers transmit uplink signals over the wireless channels to the base station. Thus, for downlink communication the base station is a transmitter and the subscribers are receivers, while for uplink communication the base station is a receiver and the subscribers are transmitters. Subscribers may be mobile or fixed. Exemplary subscribers include devices such as portable telephones, car phones, and stationary receivers such as a wireless modem at a fixed location.

The base station can be provided with multiple antennas that allow antenna diversity techniques and/or spatial multiplexing techniques. In addition, each subscriber can be equipped with multiple antennas that permit further spatial multiplexing and/or antenna diversity. Single Input Multiple Output (SIMO), Multiple Input Single Output (MISO) or Multiple Input Multiple Output (MIMO) configurations are all possible. In either of these configurations, the communications techniques can employ single-carrier or multi-carrier communications techniques. Although the techniques of the present invention apply to point-to-multipoint systems, they are not limited to such systems, but apply to any wireless communication system having at least two devices in wireless communication. Accordingly, for simplicity, the following description will focus on the invention as applied to a single transmitter-receiver pair, even though it is understood that it applies to systems with any number of such pairs.

Point-to-multipoint applications of the invention can include various types of multiple access schemes. Such schemes include, but are not limited to, time division multiple access (TDMA), frequency division multiple access (FDMA), code division multiple access (CDMA), orthogonal frequency division multiple access (OFDMA) and wavelet division multiple access.

The transmission can be time division duplex (TDD). That is, the downlink transmission can occupy the same channel (same transmission frequency) as the uplink transmission, but occur at different times. Alternatively, the transmission can be frequency division duplex (FDD). That is, the downlink transmission can be at a different frequency than the uplink transmission. FDD allows downlink transmission and uplink transmission to occur simultaneously.

Typically, variations of the wireless channels cause uplink and downlink signals to experience fluctuating levels of attenuation, interference, multi-path fading and other deleterious effects. In addition, the presence of multiple signal paths (due to reflections off buildings and other obstacles in the propagation environment) causes variations of channel response over the frequency bandwidth, and these variations may change with time as well. As a result, there are temporal changes in channel communication parameters such as data capacity, spectral efficiency, throughput, and signal quality parameters, e.g., signal-to-interference and noise ratio (SINR), and signal-to-noise ratio (SNR).

Information is transmitted over the wireless channel using one of various possible transmission modes. For the purposes of the present application, a transmission mode is defined to be a particular modulation type and rate, a particular code type and rate, and may also include other controlled aspects of transmission such as the use of antenna diversity or spatial multiplexing. Using a particular transmission mode, data intended for communication over the wireless channel is coded, modulated, and transmitted. Examples of typical coding modes are convolution and block codes, and more particularly, codes known in the art such as Hamming Codes, Cyclic Codes and Reed-Solomon Codes. Examples of typical modulation modes are circular constellations such as BPSK, QPSK, and other m-ary PSK, square constellations such as 4QAM, 16QAM, and other m-ary QAM. Additional popular modulation techniques include GMSK and m-ary FSK. The implementation and use of these various transmission modes in communication systems is well known in the art.

For channels with significant delay-spread, typically orthogonal frequency division multiplexing (OFDM) modulation system (as will be described later) is employed. In an OFDM system that includes multiple frequency tones, the delay spread results in each frequency tone having a different fade.

Figure 3:
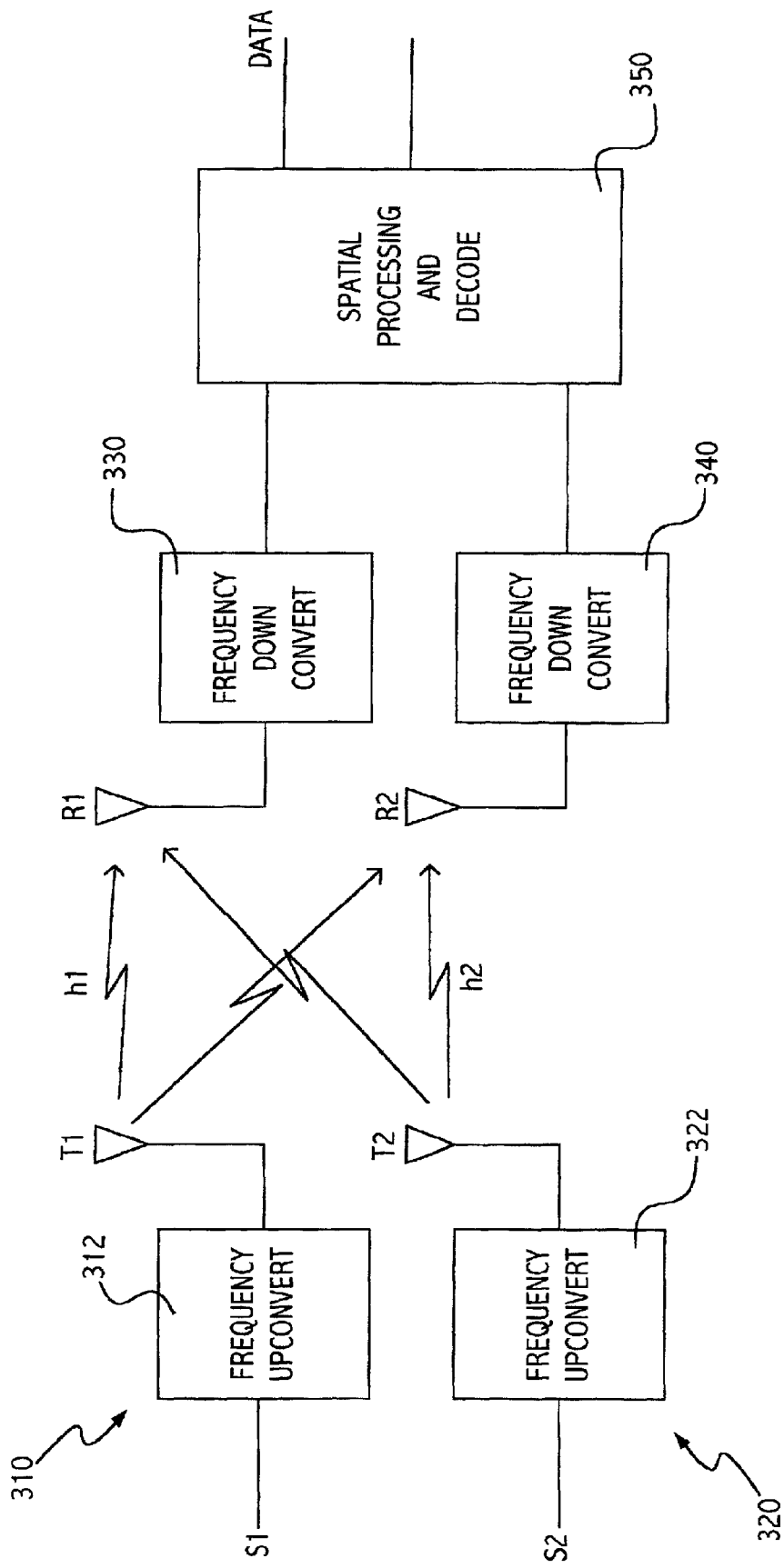
FIG. 3 shows an embodiment of the invention.

FIG. 3 shows an embodiment of the invention. This embodiment includes multiple transmitters including a plurality of transmitter antennas T1, T2, and a plurality of receiver antennas R1, R2. This embodiment only includes two transmitter antennas and two receiver antennas. However, it is to be understood that the invention can include embodiments that include either multiple transmit antennas, or multiple receiver antennas.

A first transmit chain 310 receives symbols (S1) for transmission from a first transmit antenna T1. A second transmit chain 320 receives symbols (S2) for transmission from a second transmit antenna T2. The first transmit chain 310 and the second transmit chain 320 can be spatially separate. The first transmit chain 310 can include a frequency up-conversion block 312. The second transmit chain 320 can include a frequency up-conversion block 322. The first transmit chain 310 and the second transmit chain 320 can be synchronized to separate clocks.

A multiple chain receiver can include a first receiver antenna R1 and a second receiver antenna R2. The first receiver antenna R1 can be associated with a first receiver chain that typically includes a frequency down-conversion unit 330. The second receiver antenna R2 can be associated with a second receiver chain that typically includes a frequency down-conversion unit 340. The first receiver chain and the second receiver chain can be synchronized to separate frequency references (clocks).

The transmission channels between the transmitter antennas T1, T2 and the receiver antennas R1, R2 are generally characterized by a channel matrix H. A first vector representing the channels between the first transmitter antenna T1 and the first receiver antenna R1 and the second receiver antenna R2 is designated as h1 in FIG. 3. A second vector representing the channels between the second transmitter antenna T2 and the first receiver antenna R1 and the second receiver antenna R2 is designated as h2 in FIG. 3. The channel matrix H includes the first vector h1 and the second vector h2.

The receiver includes a spatial processing and decode unit 350. The spatial processing and decode unit 350 generates estimates of the originally transmitted symbols base upon the channel matrix H and symbols that are received.

The received information signals can be transmitted from a transmitter that includes k spatial separate streams. Generally, such a transmitter applies an encoding mode to each of the k streams to encode the data to be transmitted. Before transmission, the data may be interleaved and pre-coded. Interleaving and pre-coding are well known in the art of communication systems. The transmission rate or throughput of the data varies depending upon the modulation, coding rates and transmission scheme (diversity or spatial multiplexing) used in each of the k streams.

The spatial processing and decode unit 350 performs receive processing to recover the k encoded streams. The recovered k streams are signal detected, decoded and de-multiplexed for recovery the data. In the case of antenna diversity processing, it should be understood that k is equal to one and thus there is only a single stream recovered.

An embodiment of the invention includes first estimating transmission channel elements between each transmission antenna and receiver antenna pair of the multiple channel wireless system. Next, calibration symbols are transmitted from each transmit antenna. Signals are received that correspond to the calibration symbols having traveled through the transmission channels. Received calibration symbols are estimated based upon spatial processing of the received signals and the estimated transmission channel elements, common amplitude and phase errors for each transmit and receive antenna pair are estimated by comparing the transmitted calibration symbols with the received calibration symbols.

Figure 4:
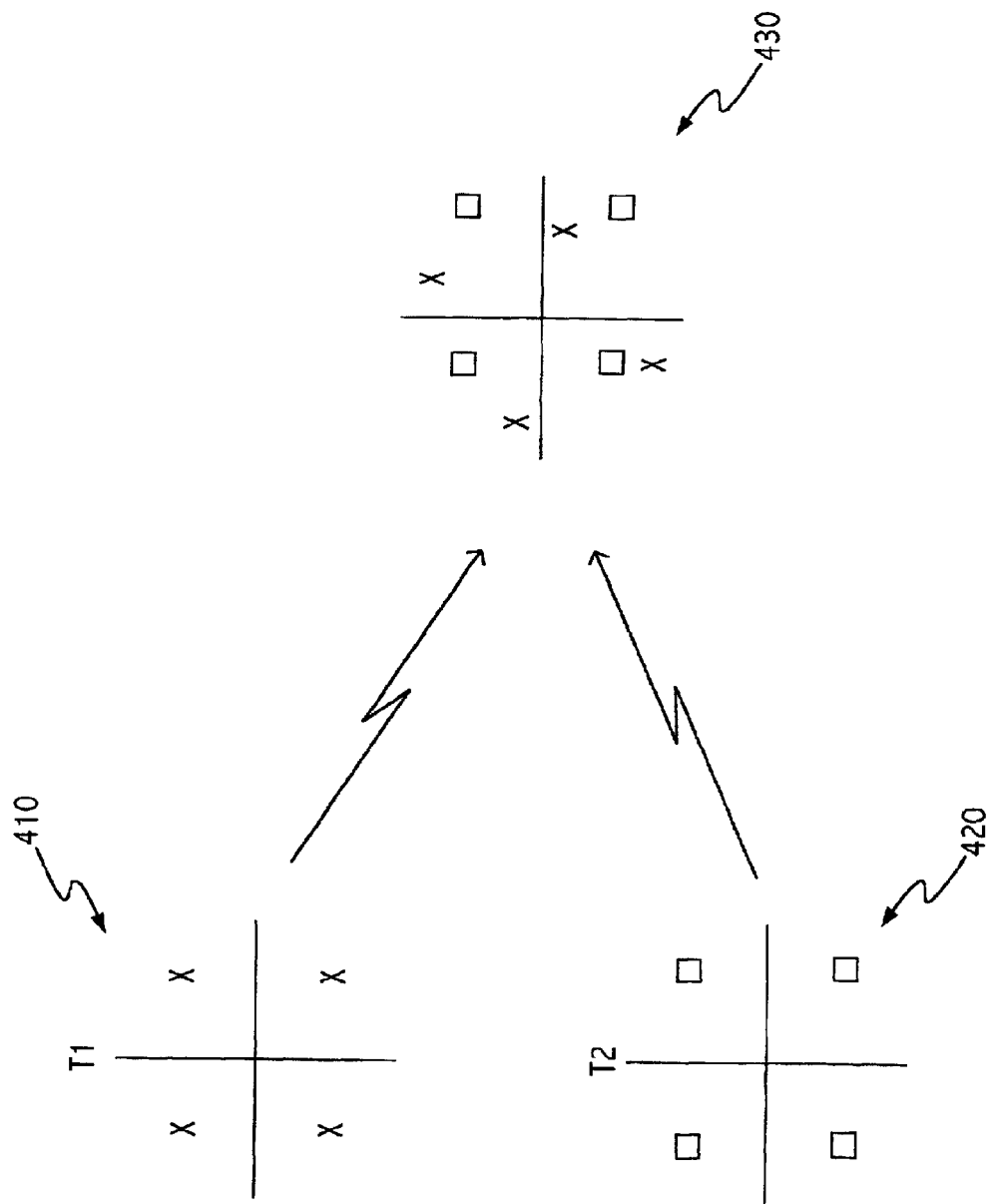
FIG. 4 show constellations of symbols that have been transmitted by separately clocked transmitter antennas.

FIG. 4 show constellations of symbols that have been transmitted by separately clocked transmitter antennas. A first transmitter antenna T1 transmits a first constellation 410, and a second transmitter antenna T2 transmits a second constellation 420. A received constellation 430 shows how phase and amplitude errors in different transmit and receive chains can distort a received constellation of the transmitted constellations. The constellations can be rotated (due to phase distortion), and shifted away from or towards the origin (due to amplitude distortion).

Figure 5:
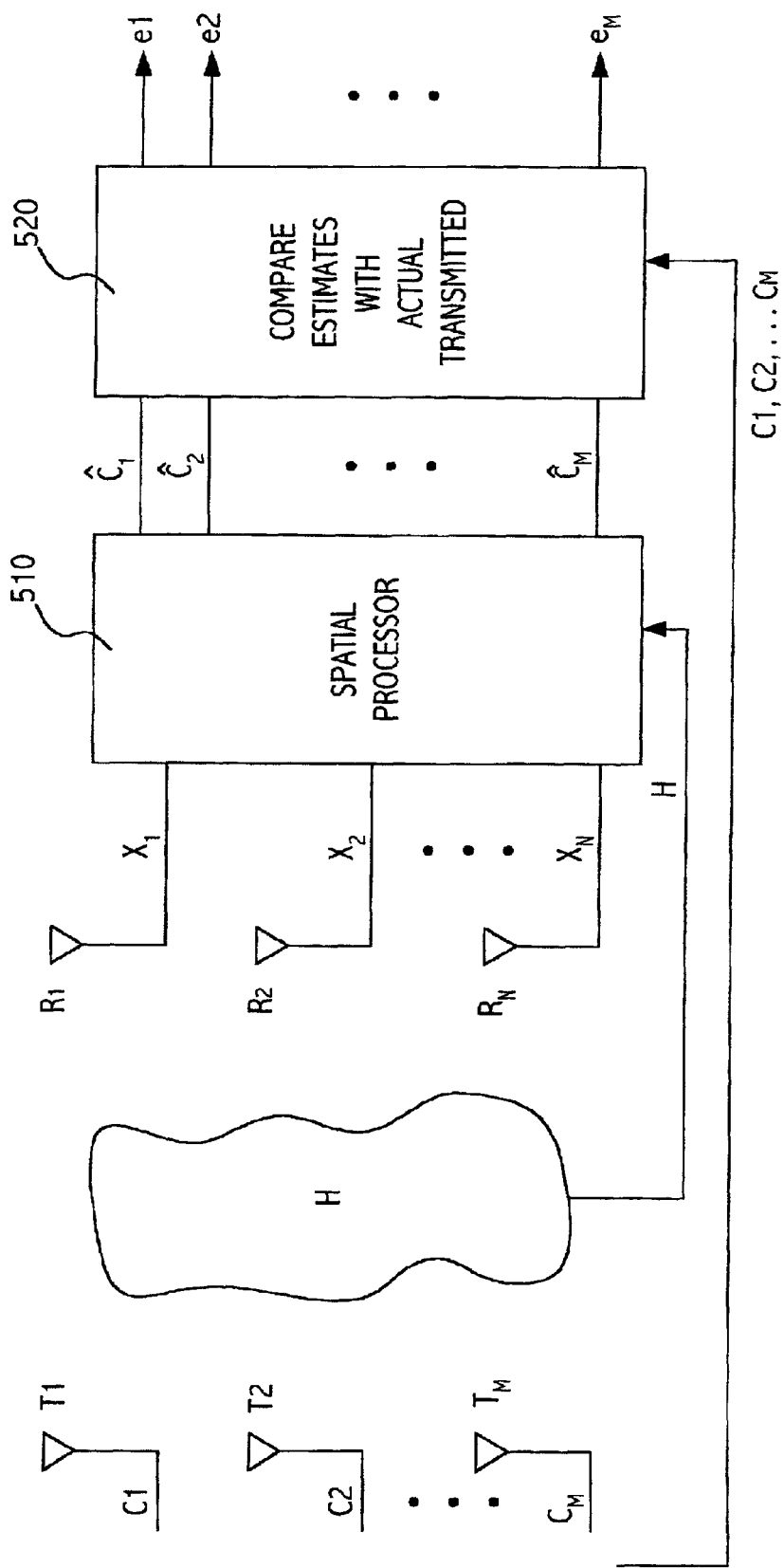
FIG. 5 shows another embodiment of the invention.

FIG. 5 shows another embodiment of the invention. This embodiment includes multiple transmit antennas T1, T2 . . . TM. Each transmit antenna transmits a corresponding calibration symbol c1, c2 . . . cM. The transmitted calibration symbols symbol c1, c2 . . . cM travel through a transmission channel represented by a channel matrix H, and are received by receiver antennas R1, R2 . . . RN.

A spatial processor 510 generates estimates of the originally transmitted calibration symbol c1, c2 . . . cM using received calibration symbols x1, x2 . . . xN, and the channel matrix H.

A compare block 520 compares the estimates with the actually transmitted calibration symbol c1, c2 . . . cM to generate error factors e1, e2 . . . eM to be used for correcting the phase and amplitude errors of data symbols subsequently transmitted.

Generally, x=Hc+n, where x is a vector representing the received signals x1, x2 . . . xN, H is the channel matrix, c is a vector representing the transmitted calibration symbols c1, c2 . . . cM, and n represents additive noise.

An embodiment of the spatial processor 510 includes a maximum likelihood (ML) receiver. An estimate c of the transmitted calibration symbols can be given as;

$$c = \mathrm{argmin}_{ct} \|x - Hct\|_F,$$

where $\|.\|$ is the Frobenius norm, and ct represents all of the possible constellations of c.

Another embodiment of the spatial processor 510 includes a minimum mean square error (MMSE) receiver. An estimate c of the transmitted calibration symbols can be given as;

$c = H^*(HH^* + R_{nn})^{-1}x$, where $R_{nn}$ is the noise covariance matrix estimated at the receiver.

Another embodiment of the spatial processor 510 includes a zero forcing (ZF) receiver. An estimate c of the transmitted calibration symbols can be given as;

$$c = H^*(HH^*)^{-1}x$$

The common phase and amplitude errors are then calculated within the compare block 520. The common phase and amplitude error between the jth transmitter and the receiver is calculated by comparing the transmitted calibration symbols $c_j$ and the received estimate of the transmitted calibration symbols $c_j$ as follows:

$$e_j = (c_j')/(c_j)$$

The calculated common phase and amplitude errors can be used to correct estimated data symbols that are transmitted from the transmit antennas T1, T2 . . . TM, and received by the receiver antennas R1, R2 . . . RN.

Figure 6:
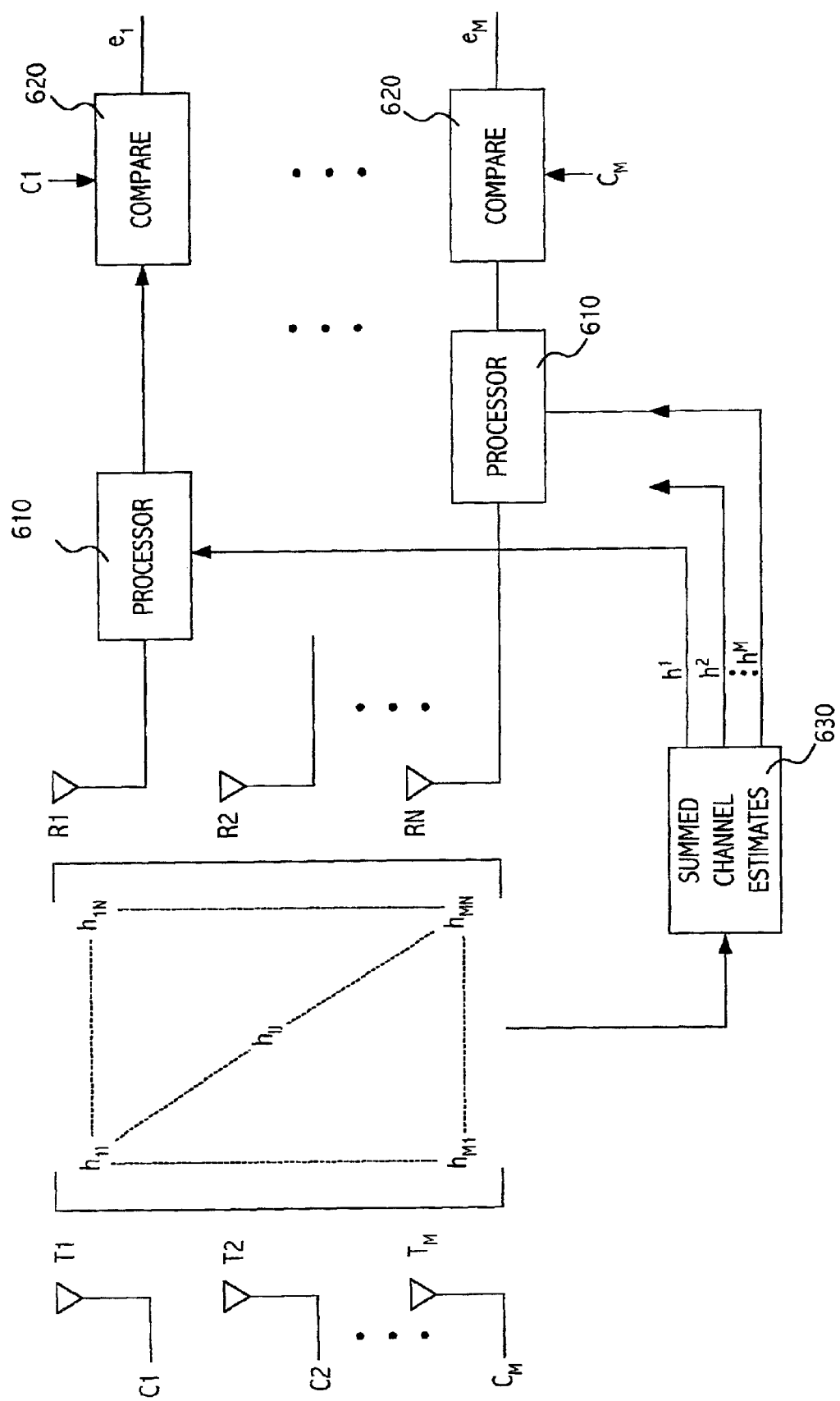
FIG. 6 shows another embodiment of the invention.

FIG. 6 shows another embodiment of the invention. This embodiment is generally applicable to multiple transmitter antenna, multiple receiver antenna systems in which the multiple receiver chains are independent. Generally, independent receiver chains are synchronized to independent reference oscillators, have different RF components, or each receiver chain is geographical located in a different place.

This embodiment includes multiple transmit antennas T1, T2 . . . TM. Each transmit antenna transmits a corresponding calibration symbol c1, c2 . . . cM. The transmitted calibration symbols symbol c1, c2 . . . cM travel through a transmission channel represented by a channel matrix H, and are received by receiver antennas R1, R2 . . . RN.

The H matrix includes M by N elements, in which each element can be numbered as indicated in FIG. 6.

A common phase and amplitude error $e_j$ between an ith receiver antenna and the transmitter can be calculated by transmitting a known, identical transmission calibration symbols c=c1=c2=cM from all of the T1, T2 . . . TM transmit antennas. A receive signal $x_i$ on an ith receiver antenna is processed by a corresponding processor 610. Generally, the processor 610 includes an implementation of one of several receiver designs to obtain an estimate c of the transmitted calibration symbols.

A summed channel estimates block 630 sums the transmission channel elements corresponding with each receiver antenna.

For a maximum likelihood receiver implementation;

$c^i = \operatorname{argmin}\|x_i - h^i c\|_F$, where $\|.\|$ is the Frobenius norm, and $h^i$ is a summed scalar channel. That is, $h^i$ (the summed channel scalar) can be determined by summing transmission channel elements corresponding with the receiver antenna.

For a MMSE or ZF receiver implementations;

$$c^i = h^{i*}(h^i h^{i*})^{-1} x_i$$

The common phase and amplitude error $e_j$ between an ith receiver antenna and the transmitter is calculated by comparing the transmitted calibration symbol c and the estimate of the received calibration symbol $c^i$ with a compare block 620. More specifically, $$e_i = (c^i)/(c).$$

The calculated common phase and amplitude errors can be used to correct estimated data symbols that are transmitted from the transmit antennas T1, T2 . . . TM, and received by the receiver antennas R1, R2 . . . RN.

Figure 7:
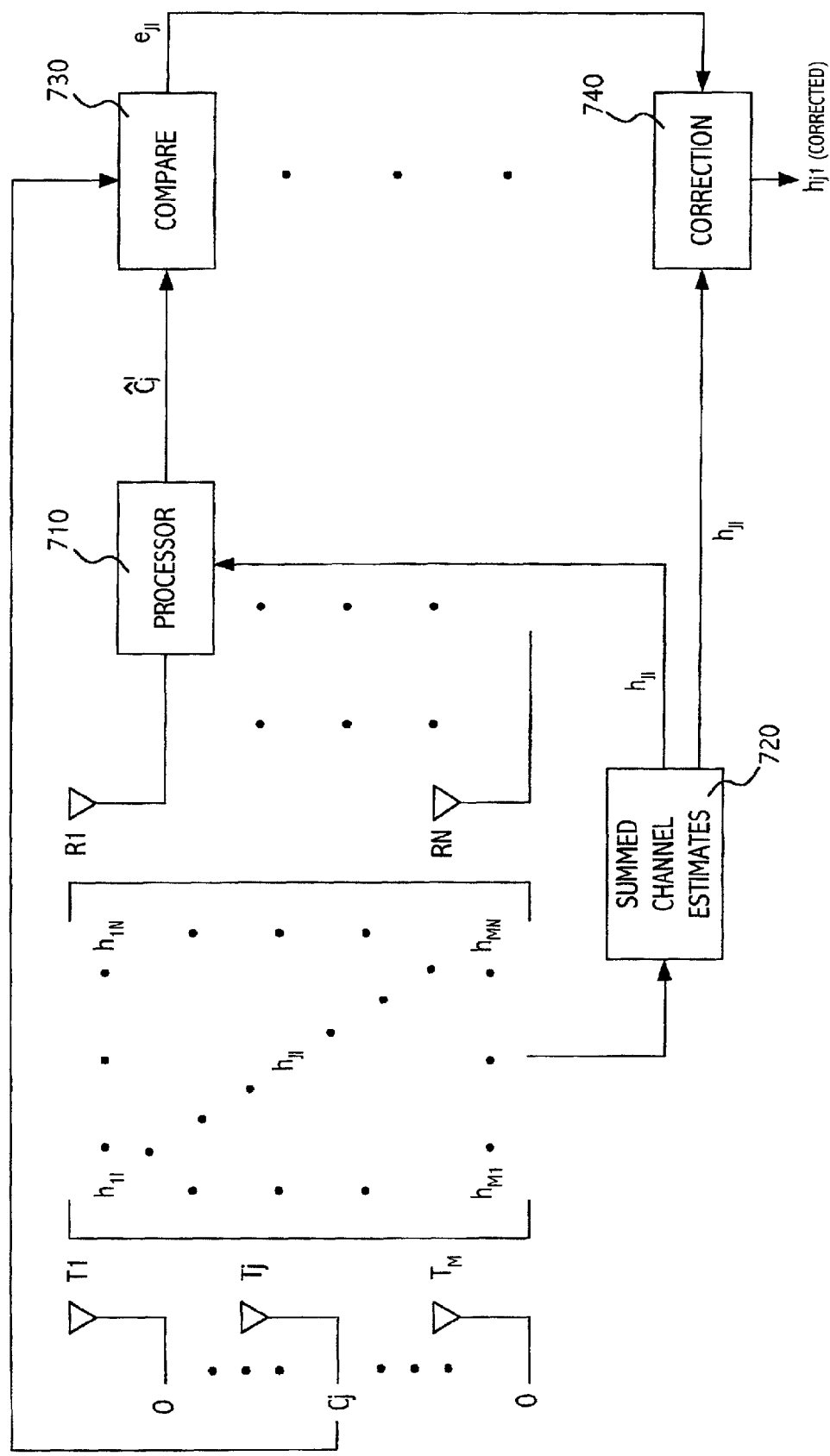
FIG. 7 shows another embodiment of the invention.

FIG. 7 shows another embodiment of the invention. This embodiment is generally applicable to multiple transmitter antenna, multiple receiver antenna systems in which both the multiple transmitter chains and the multiple receiver chains are independent. Generally, independent transmitter/receiver chains are synchronized to independent reference oscillators, have different RF components, or each transmitter/receiver chain is geographical located in a different place.

This embodiment includes multiple transmit antennas T1, T2 . . . TM. Each transmit antenna transmits a corresponding calibration symbol c1, c2 . . . cM. The transmitted calibration symbols symbol c1, c2 . . . cM travel through a transmission channel represented by a channel matrix H, and are received by receiver antennas R1, R2 . . . RN.

The H matrix includes M by N elements, in which each element can be numbered as indicated in FIG. 7.

A known transmission calibration symbols $c_j$ is transmitted from a jth transmit antennas. Zeroed or nulled symbols are transmitted from all the other transmit antennas. A receive signal $x_i$ on an ith receiver antenna is processed by a corresponding processor 710. Generally, the processor 710 includes an implementation of one of several receiver designs to obtain an estimate c of the transmitted calibration symbols. The estimate is of a calibration symbol transmitted from the jth transmission antenna and received by the ith receiver antenna and is designated by $c_j^i$.

A channel element selector 720 selects each element within the channel matrix H corresponding with the non-zeroed transmit antenna and the present receive antenna.

For an ML receiver, an estimate of $c_j^i$ can be given as:

$$c_j^i = \operatorname{argmin}\|x_i - h_{ij} c_j\|_F.$$

For an MMSE or ZF receiver, an estimate of $c_j^i$ can be given as:

$$c_j^i = (h_{ij})^{-1} x_i$$

The common phase and amplitude error $e_j$ between an ith receiver antenna and the jth transmitter antenna is calculated by comparing the transmitted calibration symbol c and the estimate of the received calibration symbol $c^i$ with a compare block 730. More specifically, $$e_{ij} = (c_j^i)/(c_j).$$

The calculated common phase and amplitude errors can be used to correct estimated data symbols that are transmitted from the transmit antennas T1, T2 . . . TM, and received by the receiver antennas R1, R2 . . . RN. A correction block 740 provides correction of the elements within the channel matrix H based upon the common phase and amplitude errors.

Figure 8:
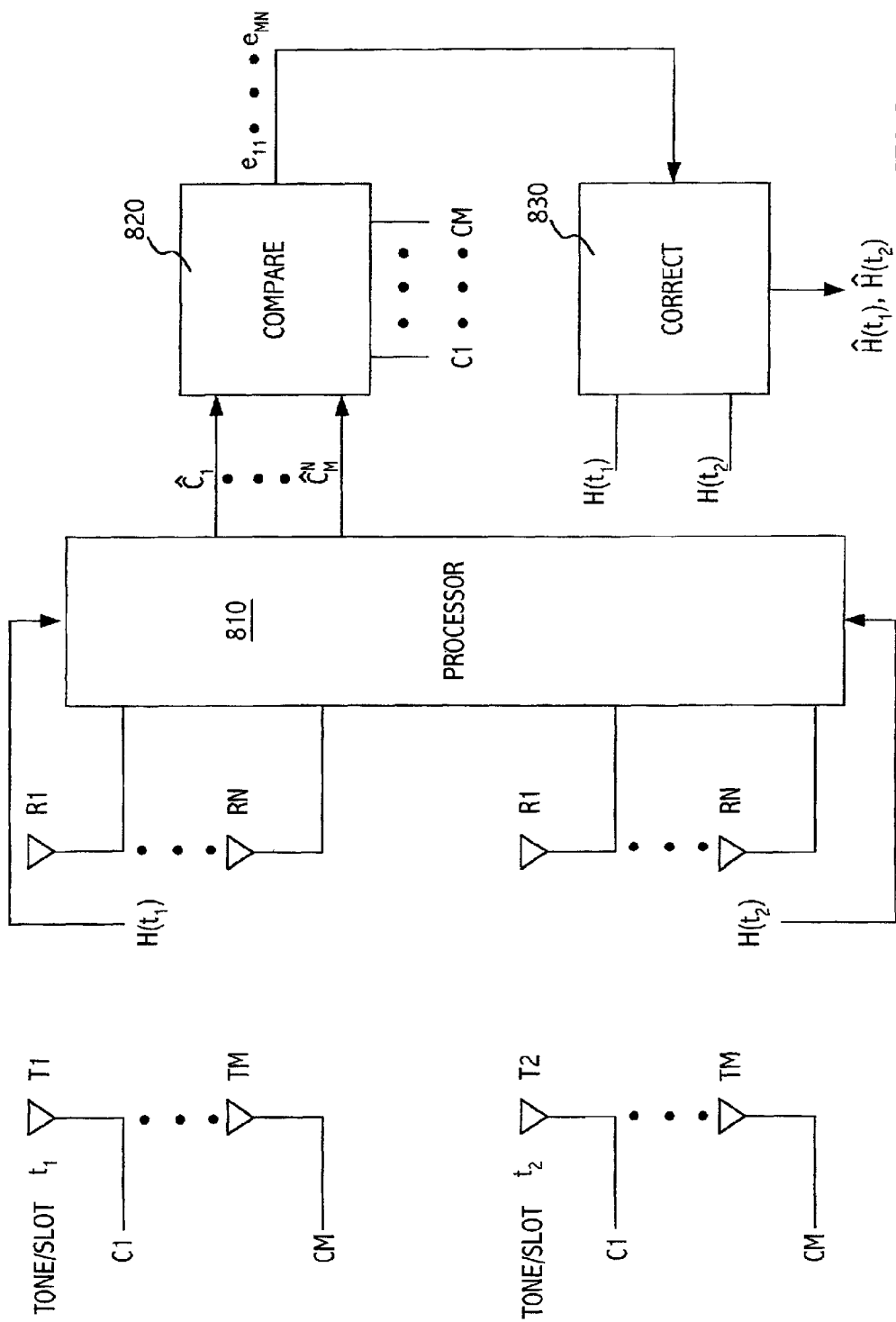
FIG. 8 shows another embodiment of the invention.

FIG. 8 shows another embodiment of the invention. This embodiment is generally applicable to multiple transmitter antenna, multiple receiver antenna systems in which both the multiple transmitter chains and the multiple receiver chains are independent. Generally, independent transmitter/receiver chains are synchronized to independent reference oscillators, have different RF components, or each transmitter/receiver chain is geographical located in a different place.

This embodiment includes multiple transmit antennas T1, T2 . . . TM. Each transmit antenna transmits a corresponding calibration symbol c1, c2 . . . cM. The transmitted calibration symbols symbol c1, c2 . . . cM travel through a transmission channel represented by a channel matrix H, and are received by receiver antennas R1, R2 . . . RN.

The H matrix includes M by N elements, in which each element can be numbered as indicated in FIG. 8.

This embodiment is adaptable for use within wireless transmission systems that utilize multiple carrier transmission (like the previously mention OFDM transmission), or transmit during predefined time slots.

OFDM systems include multiple carriers (or tones) that divide transmitted data across the available frequency spectrum. In OFDM systems, each tone is considered to be orthogonal (independent or unrelated) to the adjacent tones. OFDM systems use bursts of data, each burst of a duration of time that is much greater than the delay spread to minimize the effect of ISI caused by delay spread. Data is transmitted in bursts, and each burst consists of a cyclic prefix followed by data symbols, and/or data symbols followed by a cyclic suffix.

As shown in FIG. 8, known transmission calibration vectors c(t1)=. . . =c(tT) are transmitted during multiple time slots or on multiple carriers. The other time slots or carriers are nulled. The number of transmit antennas and the number of tones/time slots can vary. A first channel matrix H(t1) corresponds with a first time slot/first carrier, and a second channel matrix h(t2) corresponds to with a second time slot/second carrier.

Received signals at tones/slots t1 . . . tT can be represented as x(t1), . . . x(tT). The received signals can be processed by a processor 810. The receiver processing can be implemented as a ML receiver as follows:

$c^i = \mathrm{argmin}_c \|x - cH\|_F$, in which $$x = \begin{bmatrix} x_i(t_1) \\ \vdots \\ \vdots \\ \vdots \\ x_i(t_T) \end{bmatrix}, \text{ and}$$

$$H = \begin{bmatrix} h_i(t_1) \\ \vdots \\ \vdots \\ \vdots \\ h_i(t_T) \end{bmatrix}, \text{ and where}$$

$\|.\|_F$ is the Frobenius norm.

The receiver processing can also be implemented as an MMSE receiver as follows:

$c^i = H^*(HH^* + R_{nn})^{-1} x_I$, where $R_{nn}$ is a noise covariance matrix estimated at the receiver across the tones/slots t1 . . . tT and the receiver antennas 1 . . . RN.

The common phase and amplitude error $e_j$ between an ith receiver antenna and the jth transmitter antenna is calculated by comparing the transmitted calibration symbol c and the estimate of the received calibration symbol $c^i$ with a compare block 820. More specifically, $e_{ij} = (c_j^i)/(c_j)$.

The calculated common phase and amplitude errors can be used to correct estimated data symbols that are transmitted from the transmit antennas T1, T2 . . . TM, and received by the receiver antennas R1, R2 . . . RN. A correction block 830 provides correction of the elements within the channel matrices H(t1), H(t2) based upon the common phase and amplitude errors.

Figure 9:
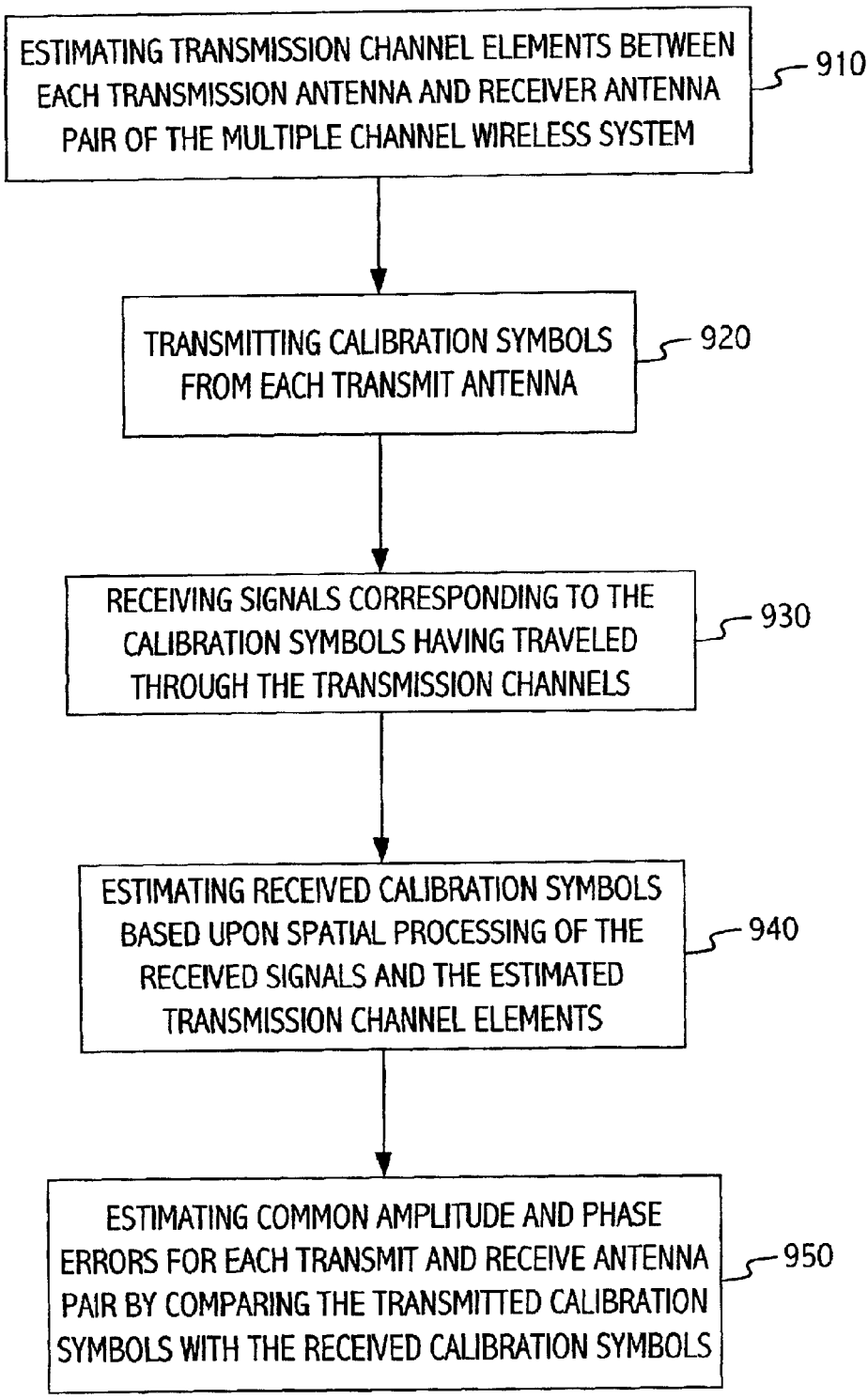
FIG. 9 shows a flow chart of steps or acts included within an embodiment of the invention.

FIG. 9 shows a flow chart of steps or acts included within an embodiment of the invention. This embodiment includes method of estimating common amplitude and phase errors of a multiple channel wireless system. The multiple channel wireless system includes a plurality of transmission channels formed between a plurality of transmission antennas and a plurality of receiver antennas.

A first step 910 includes estimating transmission channel elements between each transmission antenna and receiver antenna pair of the multiple channel wireless system.

A second step 920 includes transmitting calibration symbols from each transmit antenna.

A third step 930 includes receiving signals corresponding to the calibration symbols having traveled through the transmission channels.

A fourth step 940 includes estimating received calibration symbols based upon spatial processing of the received signals and the estimated transmission channel elements.

A fifth step 950 includes estimating common amplitude and phase errors for each transmit and receive antenna pair by comparing the transmitted calibration symbols with the received calibration symbols.

Figure 10:
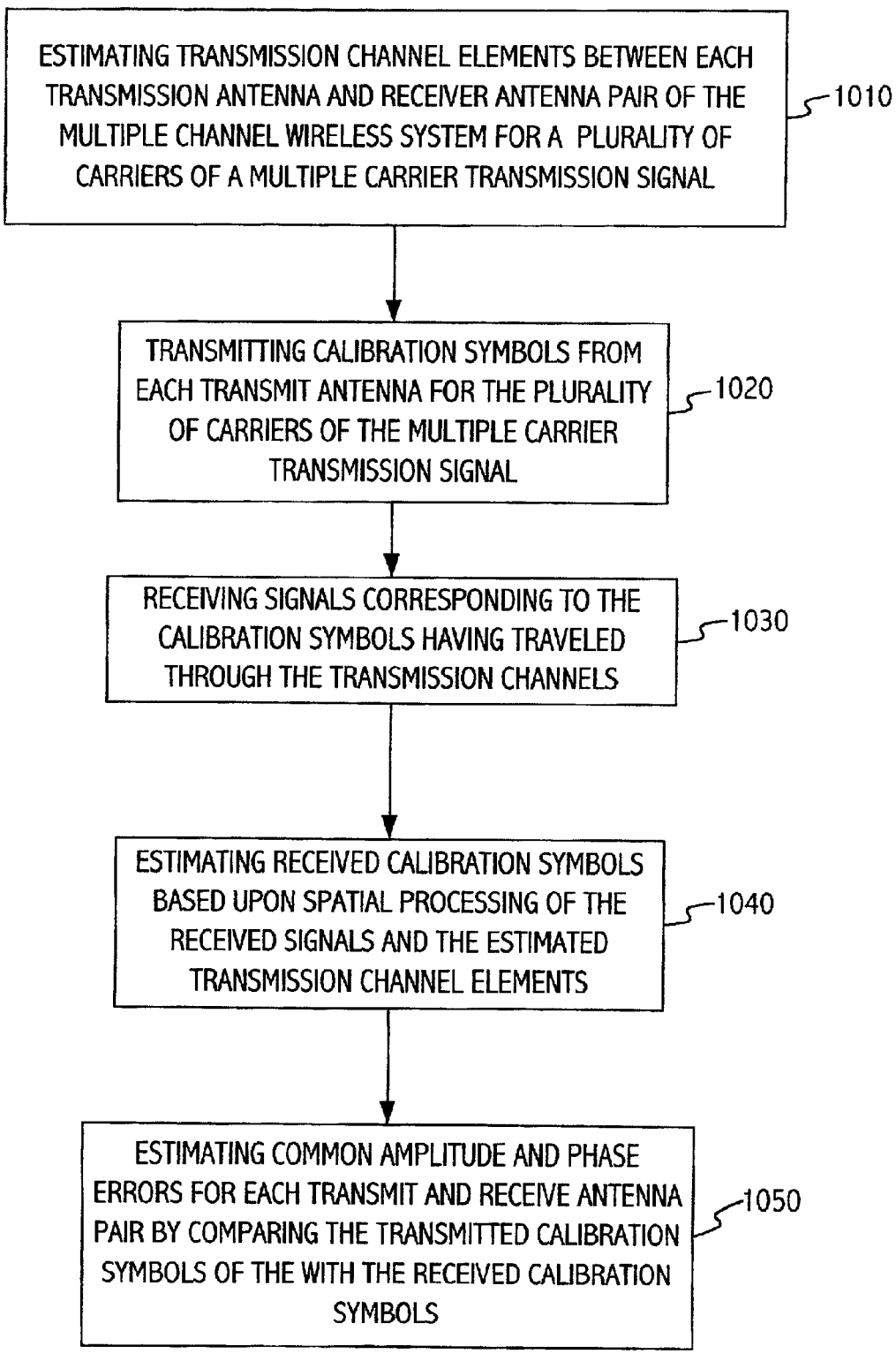
FIG. 10 shows a flow chart of steps or acts included within another embodiment of the invention.

FIG. 10 shows a flow chart of steps or acts included within an embodiment of the invention. This embodiment includes a method of estimating common amplitude and phase errors of a multiple channel wireless system. The multiple channel wireless system includes a plurality of transmission channels formed between at least one transmission antenna and at least one receiver antenna.

A first step 1010 includes estimating transmission channel elements between each transmission antenna and receiver antenna pair of the multiple channel wireless system for a plurality of carriers of a multiple carrier transmission signal.

A second step 1020 includes transmitting calibration symbols from each transmit antenna for the plurality of carriers of the multiple carrier transmission signal.

A third step 1030 includes receiving signals corresponding to the calibration symbols having traveled through the transmission channels.

A fourth step 1040 includes estimating received calibration symbols based upon spatial processing of the received signals and the estimated transmission channel elements.

A fifth step 1050 includes estimating common amplitude and phase errors for each transmit and receive antenna pair by comparing the transmitted calibration symbols with the received calibration symbols.

Figure 11:
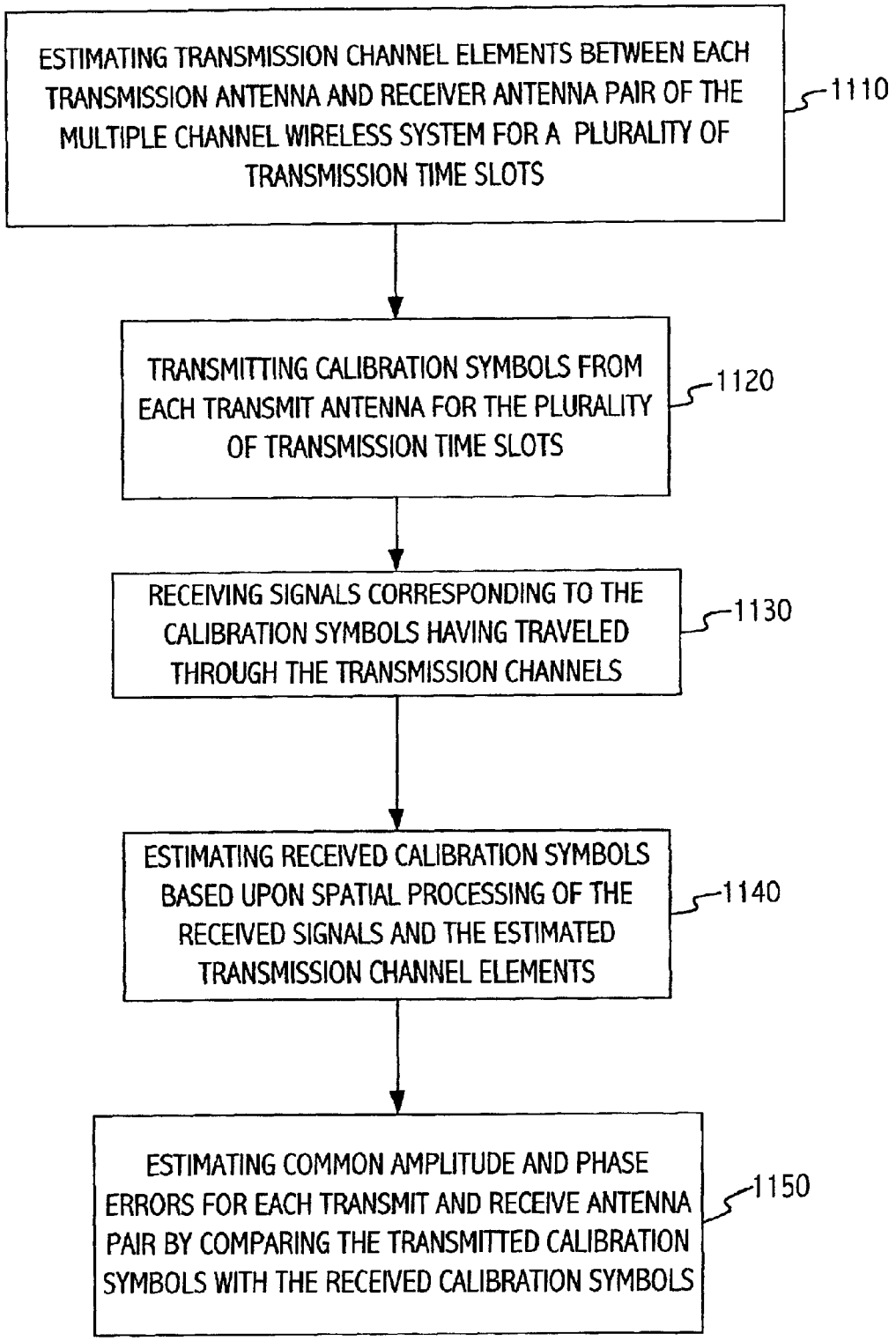
FIG. 11 shows a flow chart of steps or acts included within another embodiment of the invention.

FIG. 11 shows a flow chart of steps or acts included within an embodiment of the invention. This embodiment includes a method of estimating common amplitude and phase errors of a multiple channel wireless system. The multiple channel wireless system includes a plurality of transmission channels formed between at least one transmission antenna and at least one receiver antenna.

A first step 1110 includes estimating transmission channel elements between each transmission antenna and receiver antenna pair of the multiple channel wireless system for a plurality of transmission time slots.

A second step 1120 includes transmitting calibration symbols from each transmit antenna for the plurality of transmission time slots.

A third step 1130 includes receiving signals corresponding to the calibration symbols having traveled through the transmission channels.

A fourth step 1140 includes estimating received calibration symbols based upon spatial processing of the received signals and the estimated transmission channel elements.

A fifth step 1150 includes estimating common amplitude and phase errors for each transmit and receive antenna pair by comparing the transmitted calibration symbols of the with the received calibration symbols.

FIG. 12 shows a flow chart of steps or acts included within an embodiment of the invention. This embodiment includes a method of estimating common amplitude and phase errors of a multiple channel wireless system. The multiple channel wireless system includes a plurality of transmission channels formed between at least one transmission antenna and at least one receiver antenna.

A first step 1210 includes estimating transmission channel elements between each transmission antenna and receiver antenna pair of the multiple channel wireless system for a plurality of carriers of a multiple carrier transmission signal and a plurality of time slots.

A second step 1220 includes transmitting calibration symbols from each transmit antenna for the plurality of carriers of the multiple carrier transmission signal and plurality of time slots.

A third step 1230 includes receiving signals corresponding to the calibration symbols having traveled through the transmission channels.

A fourth step 1240 includes estimating received calibration symbols based upon spatial processing of the received signals and the estimated transmission channel elements.

A fifth step 1250 includes estimating common amplitude and phase errors for each transmit and receive antenna pair by comparing the transmitted calibration symbols of the with the received calibration symbols.

Although specific embodiments of the invention have been described and illustrated, the invention is not to be limited to the specific forms or arrangements of parts so described and illustrated. The invention is limited only by the claims.

What is claimed:

1. A method of estimating common amplitude and phase errors of a multiple channel wireless system, the multiple channel wireless system comprising a plurality of transmission channels formed between a plurality of transmission antennas and a plurality of receiver antennas, the method comprising:
    estimating transmission channel elements between each transmission antenna and receiver antenna pair of the multiple channel wireless system;
    transmitting calibration symbols from each transmit antenna;
    receiving signals corresponding to the calibration symbols having traveled through the transmission channels;
    estimating received calibration symbols based upon spatial processing of the received signals and the estimated transmission channel elements; and
    estimating common amplitude and phase errors for each transmit and receive antenna pair by comparing the transmitted calibration symbols with the received calibration symbols.

2. The method of estimating common amplitude and phase errors of a multiple channel wireless system of claim 1, further comprising:
    correcting spatially processed received data symbols with the estimated common amplitude and phase errors.

3. The method of estimating common amplitude and phase errors of a multiple channel wireless system of claim 1, further comprising:
    correcting the estimated transmission channel elements with the estimated common amplitude and phase errors.

4. The method of estimating common amplitude and phase errors of a multiple channel wireless system of claim 1, wherein transmission chains associated with the transmission antennas are independent, and receiver chains associated with the receiver antennas are dependent, the method further comprising:
    forming a channel matrix from the transmission channel elements between each transmit antenna and receive antenna pair; and
    wherein the spatial processing comprises:
        estimating the received calibration symbols using the channel matrix and an equivalent maximum likelihood (ML) receiver structure.

5. The method of estimating common amplitude and phase errors of a multiple channel wireless system of claim 1, wherein transmission chains associated with the transmission antennas are independent, and receiver chains associated with the receiver antennas are dependent, the method further comprising:
    forming a channel matrix from the transmission multiplier estimates between each
    transmit antenna and receive antenna pair; and
    wherein the spatial processing comprises:
        estimating the received calibration symbols using the channel matrix and
        an equivalent minimum mean squared error (MMSE) receiver structure.

6. The method of estimating common amplitude and phase errors of a multiple channel wireless system of claim 1, wherein transmission chains associated with the transmission antennas are independent, and receiver chains associated with the receiver antennas are dependent, the method further comprising:
    forming a channel matrix from the transmission multiplier estimates between each
    transmit antenna and receive antenna pair; and
    wherein the spatial processing comprises:
        estimating the received calibration symbols using the channel matrix and
        an equivalent zero forcing (ZF) receiver structure.

7. The method of estimating common amplitude and phase errors of a multiple channel wireless system of claim 1, wherein transmission chains associated with the transmission antennas are independent, and receiver chains associated with the receiver antennas are dependent, the method further comprising:
    forming a channel matrix from the transmission multiplier estimates between each transmit antenna and receive antenna pair; and
    wherein the spatial processing comprises:
        estimating the received calibration symbols using the channel matrix and
    an equivalent decision feedback equalizer (DFE) receiver structure.

8. The method of estimating common amplitude and phase errors of a multiple channel wireless system of claim 1, wherein transmission chains associated with the transmission antennas are dependent, and receiver chains associated with the receiver antennas are independent,
    and wherein identical transmission calibration symbols are transmitted from all of the transmission antennas; the method further comprising:
        generating a summed channel scalar for each receiver antenna by summing transmission channel elements corresponding with the receiver antenna; and wherein the spatial processing comprises:
            estimating the received calibration symbol for each receiver antenna using the corresponding summed channel scalar and an equivalent maximum likelihood (ML) receiver structure.

9. The method of estimating common amplitude and phase errors of a multiple channel wireless system of claim 1, wherein transmission chains associated with the transmission antennas are dependent, and receiver chains associated with the receiver antennas are independent,
    and wherein identical transmission calibration symbols are transmitted from all of the transmission antennas; the method further comprising: generating a summed channel scalar for each receiver antenna by summing transmission channel elements corresponding with the receiver antenna; and wherein the spatial processing comprises:

estimating the received calibration symbol for each receiver antenna using the corresponding summed channel scalar and a zero forcing (ZF) receiver structure.

10. The method of estimating common amplitude and phase errors of a multiple channel wireless system of claim 1, wherein transmission chains associated with the transmission antennas are independent, and receiver chains associated with the receiver antennas are independent, and wherein transmitting calibration symbols from each transmit antenna comprises progressively transmitting calibration symbols from each transmission antenna while all other transmission antennas are zeroed; and further comprising:

forming an inverted channel element by inverting the transmission channel elements for each transmit antenna and receive antenna pair; and estimating the received calibration symbol for each receiver antenna based upon spatial processing of the received signals of the corresponding receiver antenna and the corresponding inverted channel element.

11. A method of estimating common amplitude and phase errors of a multiple channel wireless system, the multiple channel wireless system comprising a plurality of transmission channels formed between at least one transmission antenna and at least one receiver antenna, the method comprising:

estimating transmission channel elements between each transmission antenna and receiver antenna pair of the multiple channel wireless system for a plurality of carriers of a multiple carrier transmission signal;

transmitting calibration symbols from each transmit antenna for the plurality of carriers of the multiple carrier transmission signal;

receiving signals corresponding to the calibration symbols having traveled through the transmission channels;

estimating received calibration symbols based upon spatial processing of the received signals and the estimated transmission channel elements; and estimating common amplitude and phase errors for each transmit and receive antenna pair by comparing the transmitted calibration symbols with the received calibration symbols.

12. The method of estimating common amplitude and phase errors of a multiple channel wireless system of claim 11, wherein the spatial processing comprises:

estimating received calibration symbols using the estimated transmission channel elements and an equivalent of at least one of an ML, MMSE, ZF and DFE receiver structures.

13. A method of estimating common amplitude and phase errors of a multiple channel wireless system, the multiple channel wireless system comprising a plurality of transmission channels formed between at least one transmission antenna and at least one receiver antenna, the method comprising:

estimating transmission channel elements between each transmission antenna and receiver antenna pair of the multiple channel wireless system for a plurality of transmission time slots;

transmitting calibration symbols from each transmit antenna for the plurality of transmission time slots;

receiving signals corresponding to the calibration symbols having traveled through the transmission channels;

estimating received calibration symbols based upon spatial processing of the received signals and the estimated transmission channel elements; and estimating common amplitude and phase errors for each transmit and receive antenna pair by comparing the transmitted calibration symbols of the with the received calibration symbols.

14. The method of estimating common amplitude and phase errors of a multiple channel wireless system of claim 13, wherein the spatial processing comprises:

estimating received calibration symbols using the estimated transmission channel elements and an equivalent of at least one of an ML, MMSE, ZF and DFE receiver structures.

15. A method of estimating common amplitude and phase errors of a multiple channel wireless system, the multiple channel wireless system comprising a plurality of transmission channels formed between at least one transmission antenna and at least one receiver antenna, the method comprising:

estimating transmission channel elements between each transmission antenna and receiver antenna pair of the multiple channel wireless system for a plurality of carriers of a multiple carrier transmission signal and a plurality of time slots;

transmitting calibration symbols from each transmit antenna for the plurality of carriers of the multiple carrier transmission signal and plurality of time slots;

receiving signals corresponding to the calibration symbols having traveled through the transmission channels;

estimating received calibration symbols based upon spatial processing of the received signals and the estimated transmission channel elements; and estimating common amplitude and phase errors for each transmit and receive antenna pair by comparing the transmitted calibration symbols of the with the received calibration symbols.

16. The method of estimating common amplitude and phase errors of a multiple channel wireless system of claim 15, wherein the spatial processing comprises:

estimating received calibration symbols using the estimated transmission channel elements and an equivalent of at least one of an ML, MMSE, ZF and DFE receiver structures.

17. An apparatus for estimating common amplitude and phase errors of a multiple channel wireless system, the multiple channel wireless system comprising a plurality of transmission channels formed between a plurality of transmission antennas and a plurality of receiver antennas, the apparatus comprising:

means for estimating transmission channel elements between each transmission antenna and receiver antenna pair of the multiple channel wireless system;

means for transmitting calibration symbols from each transmit antenna;

means for receiving signals corresponding to the calibration symbols having traveled through the transmission channels;

means for estimating received calibration symbols based upon spatial processing of the received signals and the estimated transmission channel elements; and means for estimating common amplitude and phase errors for each transmit and receive antenna pair by comparing the transmitted calibration symbols with the received calibration symbols.

18. An apparatus for estimating common amplitude and phase errors of a multiple channel wireless system, the multiple channel wireless system comprising a plurality of transmission channels formed between at least one transmission antenna and at least one receiver antenna, the apparatus comprising:

means for estimating transmission channel elements between each transmission antenna and receiver antenna pair of the multiple channel wireless system for a plurality of carriers of a multiple carrier transmission signal;

means for transmitting calibration symbols from each transmit antenna for the plurality of carriers of the multiple carrier transmission signal;

means for receiving signals corresponding to the calibration symbols having traveled through the transmission channels;

means for estimating received calibration symbols based upon spatial processing of the received signals and the estimated transmission channel elements; and means for estimating common amplitude and phase errors for each transmit and receive antenna pair by comparing the transmitted calibration symbols with the received calibration symbols.

19. An apparatus for estimating common amplitude and phase errors of a multiple channel wireless system, the multiple channel wireless system comprising a plurality of transmission channels formed between at least one transmission antenna and at least one receiver antenna, the apparatus comprising:

means for estimating transmission channel elements between each transmission antenna and receiver antenna pair of the multiple channel wireless system for a plurality of transmission time slots;

means for transmitting calibration symbols from each transmit antenna for the plurality of transmission time slots;

means for receiving signals corresponding to the calibration symbols having traveled through the transmission channels;

means for estimating received calibration symbols based upon spatial processing of the received signals and the estimated transmission channel elements; and means for estimating common amplitude and phase errors for each transmit and receive antenna pair by comparing the transmitted calibration symbols of the with the received calibration symbols.

20. An apparatus for estimating common amplitude and phase errors of a multiple channel wireless system, the multiple channel wireless system comprising a plurality of transmission channels formed between at least one transmission antenna and at least one receiver antenna, the apparatus comprising:

means for estimating transmission channel elements between each transmission antenna and receiver antenna pair of the multiple channel wireless system for a plurality of carriers of a multiple carrier transmission signal and a plurality of time slots;

means for transmitting calibration symbols from each transmit antenna for the plurality of carriers of the multiple carrier transmission signal and plurality of time slots;

means for receiving signals corresponding to the calibration symbols having traveled through the transmission channels;

means for estimating received calibration symbols based upon spatial processing of the received signals and the estimated transmission channel elements; and means for estimating common amplitude and phase errors for each transmit and receive antenna pair by comparing the transmitted calibration symbols of the with the received calibration symbols.

* * * * *